United States Patent [19]

Maycock et al.

[11] Patent Number: 4,770,282

[45] Date of Patent: Sep. 13, 1988

[54] DIAPHRAGM SPRING CLUTCH COVER ASSEMBLY

[75] Inventors: Ian C. Maycock; Peter A. Romer, both of Leamington Spa; Steven Trotman, Straton-on-Avon, all of England

[73] Assignee: Automotive Products plc, Leamington Spa, England

[21] Appl. No.: 8,556

[22] Filed: Jan. 29, 1987

[30] Foreign Application Priority Data

Mar. 5, 1986 [GB] United Kingdom ................. 8605486

[51] Int. Cl.⁴ ...................... F16D 13/50; F16D 13/70
[52] U.S. Cl. ............................... 192/70.27; 192/89 B; 192/109 A
[58] Field of Search ............... 192/70.27, 89 B, 109 A, 192/109 B

[56] References Cited

U.S. PATENT DOCUMENTS

| 2,359,104 | 9/1944 | Geyer | 192/70.27 |
|---|---|---|---|
| 3,323,624 | 6/1967 | Maurice | 192/89 B |
| 4,095,683 | 6/1978 | Ban | 192/89 B |
| 4,184,578 | 1/1980 | Moore et al. | 192/89 B |
| 4,210,233 | 7/1980 | Courbot | 192/70.27 |
| 4,291,792 | 9/1981 | Henao | 192/89 B |
| 4,629,048 | 12/1986 | Draper et al. | 192/89 B |
| 4,635,779 | 1/1987 | Bacher et al. | 192/89 B |
| 4,676,357 | 6/1987 | Trotman et al. | 192/70.27 |
| 4,678,071 | 7/1987 | Ball et al. | 192/70.27 |

FOREIGN PATENT DOCUMENTS

| 114098 | 7/1984 | European Pat. Off. . | |
| 211480 | 2/1987 | European Pat. Off. . | |
| 2529988 | 1/1976 | Fed. Rep. of Germany | 192/89 B |
| 2398227 | 2/1979 | France . | |
| 943039 | 11/1963 | United Kingdom | 192/89 B |
| 1050553 | 12/1966 | United Kingdom . | |

Primary Examiner—Rodney H. Bonck
Assistant Examiner—David A. Testardi
Attorney, Agent, or Firm—Solon B. Kemon

[57] ABSTRACT

In a diaphragm spring clutch, a clutch driven plate is clampable against a rotatably driven counter - pressure plate by a pressure plate urged by a diaphragm spring. To cushion clutch re-engagements the pressure plate has an annular array of spaced lands facing the diaphragm spring and supporting a resilient fulcrum ring having spanning portions spanning the spaces between the lands, the spanning portions of the fulcrum ring being in contact with respective radial ribs on a face of the diaphragm spring. As the diaphragm spring increasingly urges the pressure plate during a clutch re-engagement, the spanning portions of the fulcrum ring are resiliently deformed by the ribs into the spaces between lands to axially cushion the re-engagement.

16 Claims, 3 Drawing Sheets

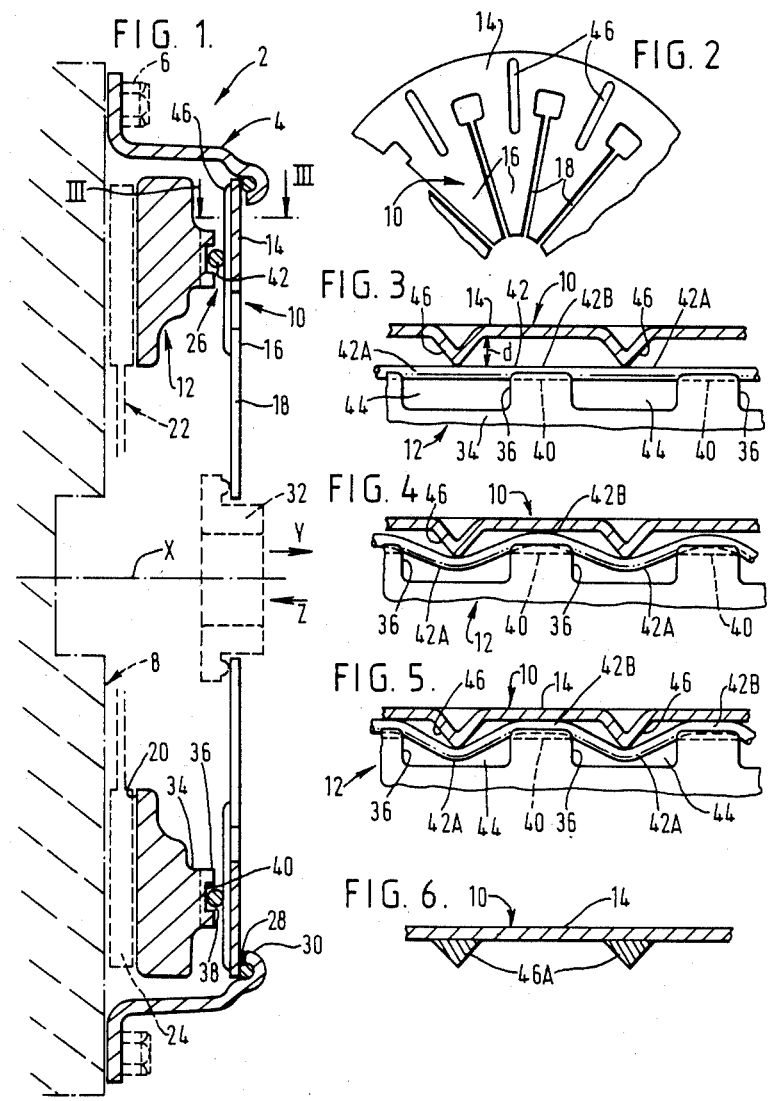

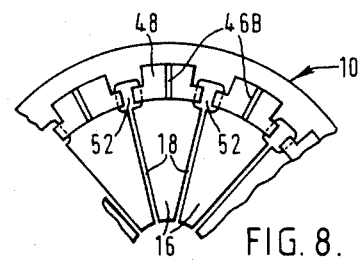
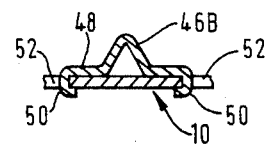
FIG. 7.
FIG. 8.
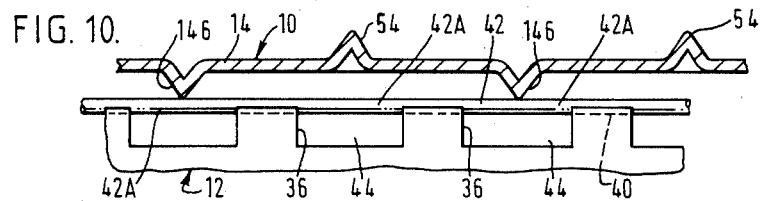
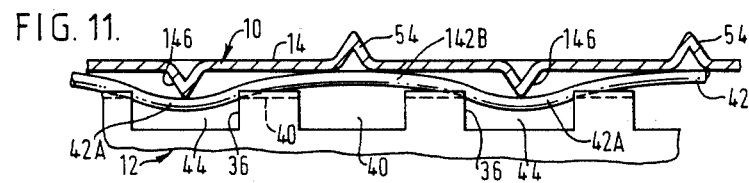
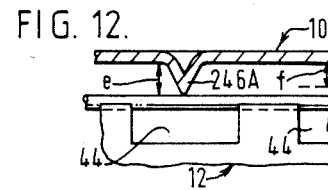
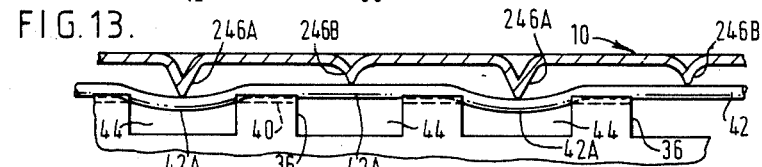
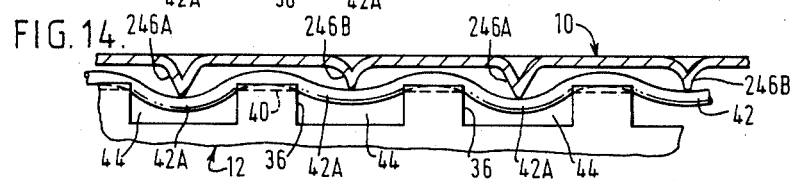

DIAPHRAGM SPRING CLUTCH COVER ASSEMBLY

BACKGROUND OF THE INVENTION

This invention concerns a diaphragm spring friction clutch cover assembly of the type (hereinafter called "the type referred to") comprising a pressure plate, a cover, a diaphragm spring having a plurality of radially inwardly directed fingers, and said diaphragm spring acting between a first annular fulcrum arrangement on the pressure plate and a second annular fulcrum arrangement on the cover.

In use the assembly is secured to a driving member, for example a fly-wheel of a motor vehicle engine, so that a driven plate is clamped between the pressure plate and the driving member by the load of the diaphragm spring, the driven plate being released by an axial effort applied through a release bearing to radially inner ends of the fingers of the diaphragm spring.

In well known clutches comprising cover assemblies of the type referred to the driven plate is cushioned in that it comprises a carrier plate having friction facings mounted on cushioning between the facings. But to simplify and cheapen production of driven plates and to reduce inertia thereof, driven plates with reduced or no cushioning between the friction facings have been proposed. To compensate for this lack of cushioning it has been proposed to incorporate means which provides a degree of axial flexibilty or cushioning into one of the annular fulcra. One way of providing cushioning means in the clutch cover assembly which is simple to manufacture and install and yet can provide a subjectively acceptable clutch engagement when mounted in a motor vehicle is disclosed in G.B. No. 1583403. That patent describes a diaphragm spring clutch cover assembly of the type referred to further comprising cushioning means in one of the annular fulcra arrangements, the cushioning means being formed by a single wavy ring having undulations which extend parallel to the axis of the diaphragm spring, and the undulations being constituted by a first series and by a second series of said undulations wherein the undulations of the first series have a lower stiffness but greater axial amplitude and wavelength than the undulations of the second series. During re-engagement of the driven plate (after a disengagement) the initial cushioning is by the first series and then by both series, which ensures that the clamp load increases progressively over a substantial range of movement of the release bearing during clutch re-engagement.

It has been found that in the mass producton manufacturing of a wavy ring having undulations of differing stiffnesses and sizes it can be difficult to ensure consistency in the spring characteristics of the wavy rings.

An object of this invention is to provide a diaphragm spring clutch cover assembly of the type referred to capable of being constructed, as will be understood from the ensuing description with reference to the drawings, in which the aforesaid difficulty may be avoided and at the same time the assembly can be used to form a clutch for a motor vehicle in which clutch engagement is subjectively acceptable and the clamp load increases progressively during re-engagement.

SUMMARY OF THE INVENTION

According to the invention there is provided a diaphragm spring friction clutch cover assembly of the type referred to wherein at least one of said fulcrum arrangements comprises cushioning means comprising a resilient fulcrum ring, an annular array of spaced supporting means supporting said fulcrum ring about an axis of the diaphragm spring, portions of said fulcrum ring each spanning a respective space which is disposed between adjacent said supporting means, and said diaphragm spring being provided with projections facing towards said fulcrum ring, whereby at least some of said portions are urged at spaced locations around said fulcrum ring by said projections whereby axially of said fulcrum ring said portions of said fulcrum ring are resiliently deformed in said spaces during movement relative to said cover of the diaphragm spring for the latter to apply increasing loading on said pressure plate.

The projections may be disposed at least at a Belleville part of the diaphragm spring.

The projections may be ribs.

Preferably each rib extends from said Belleville part into a said finger.

Preferably when the diaphragm spring is applying no or a minimum loading on the pressure plate the fulcrum ring is substantially planar.

The arrangement may be such that as said first mentioned portions of the fulcrum ring are deformed axially in a first direction (as the diaphragm spring moves initially relative to the cover to apply increasing loading from a position where the spring has been applying substantially no loading or a minimum loading on the pressure plate) second portions of the ring bow axially in an opposite second axial direction towards the diaphragm spring and continued movement by said diaphragm spring compresses the bows.

In one embodiment at least one projection or rib may have, from the diaphragm spring, a depth dimension which is greater than the depth dimension of another said projection or rib.

In another embodiment a surface of a said projection pressing on a said portion of the fulcrum ring may have a concave curved shape with respect to the said portion whereby as the portion is increasingly deformed by said projection the said portion progressively conforms more closely to said curved shape at said projection thereby progressively reducing the free length of a part by the said portion extending between the projection and an adjacent said supporting means. In addition or as an alternative a surface of a said supporting means may have a concave curved shape with respect to said fulcrum ring whereby as a said portion of the fulcrum ring adjacent to that supporting means is increasingly deformed by the corresponding projection that portion progressively conforms more closely to the said curved shape at the supporting means thereby progressively reducing the free length of a part of the said portion extending between the projection and the supporting means.

If desired, the diaphragm spring may have second ribs on an opposite side of the diaphragm spring to the side on which the first mentioned ribs are disposed.

In another embodiment, along the fulcrum ring, the length of at least one of said spaces may be greater than the length of another said space so that at least one said spanning portion of the fulcrum ring is longer than another said spanning portion.

BRIEF DESCRIPTION OF THE DRAWINGS

The invention will now be further described, by way of example, with reference to the accompanying drawings in which:

FIG. 1 is a fragmentary and diagrammatic cross-section of a cover assembly formed according to the invention for a pull-type clutch; the cover assembly being shown in combination with other parts, in dotted lines, to form a clutch;

FIG. 2 a fragmentary plan view, on a reduced scale, of the diaphragm spring in FIG. 1;

FIG. 3 is a fragmentary cross-sectional view on line III—III in FIG. 1, but in an enlarged and illustrative form;

FIG. 4 is a view similar to FIG. 3 showing a manner of cushioning;

FIG. 5 is a view similar to FIGS. 3 and 4 showing possible futher cushioning subsequent to that illustrated in FIG. 4;

FIG. 6 in section of a fragment of a modification of the diaphram spring in FIGS. 1 to 5;

FIG. 7 is a section of a fragment of another modification of the diaphragm spring in FIGS. 1 to 5;

FIG. 8 is a plan view on a reduced scale of a fragment of the diaphragm spring in FIG. 7;

FIG. 10 is a cross-sectional view comparable with FIG. 3 of another embodiment of a clutch cover assembly formed according to the invention;

FIG. 11 shows the embodiment in FIG. 10 during a stage in cushioning;

FIG. 12 is a cross-sectional view comparable with FIG. 3 of yet a further embodiment of a clutch cover assembly formed according to the invention;

FIGS. 13 and 14 show progressive stages in cushioning provided by the embodiment in FIG. 12;

DETAILING DESCRIPTION OF EMBODIMENTS

Figure 9:
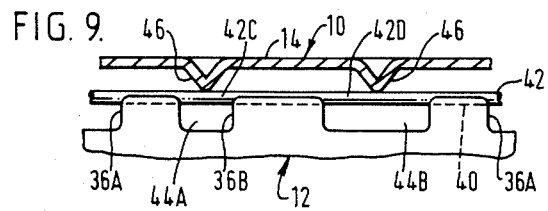
FIG. 9 is a cross-sectional view similar to FIG. 3 of another embodiment a clutch cover assembly formed according to the invention.

Referring to FIGS. 1 to 3, a clutch cover assembly 2 for a pull-type clutch, suitable for example for use in a motor vehicle, comprises a cover 4 which can be bolted at 6 to secure the cover assembly to a rotatably driven driving member or counter-pressure plate 8, for example a fly-wheel of a motor vehicle engine. The cover assembly further comprises an annular diaphragm spring 10 centred on axis X and an annular pressure plate 12 which rotates with the cover 4 about the axis X due to the cover and pressure plate being interconnected in known manner by tangential driving and release straps formed by leaf-springs (not shown). The diaphragm spring 10 has a circumferential Belleville portion 14 from which integral fingers 16, divided by radial slots 18, extend radially inwardly.

When the cover assembly 2 is in use in a clutch, face 20 of the pressure plate 12 faces towards a clutch driven plate 22 known per se having friction facings 24, which may be mounted on the driven plate in a substantially non-cushioned manner, if desired.

An annular fulcrum arrangement 26 (to be described in more detail herebelow) on the pressure plate is substantially centred on the axis X. On the opposite side of the diaphragm spring 8 is another fulcrum arrangement 28 substantially concentric with fulcrum 26 but of greater diameter and formed by a wire ring held against the diaphragm spring by turned-in part 30 on the cover.

When the clutch comprising the cover assembly is in use the driven plate 22 is released by axial movement in direction Y of a clutch release bearing 32 pulling the radially inner ends of the fingers 16 to relieve the clamp load (derived from the diaphragm spring 10) exerted on the driven plate 22 by the driving plate 8 and pressure plate 12. This corresponds with the clutch fully disengaged position which is shown in FIGS. 1 and 3.

Fulcrum arrangement 26 comprises an annular plateau 34 from which project similar castellations or lands 36 which may be arcuate in a plan view along a direction opposite to Y. In the tip of each land 36 is a groove 38 which may be arcuate about a centre on X. The grooves 38 each have a flat base 40 all lying in the same plane at substantially 90° to the axis X. The lands 36 form supporting means for a resilient fulcrum ring 42 of, for example, wire disposed in the grooves 38. The ring 42 is substantially circular being centred on axis X, but the ends of the ring are not joined together and may be spaced apart. But if desired, the circle may be completed by joining together, for example by welding, opposite ends of the wire forming the ring 42. Portions 42A of the ring 42 span gaps 44 between the adjacent lands, and portions 42B of the ring between the portions 42A rest on the groove bases 40 when the ring is in a substantially none or minimum stressed state as in FIGS. 1 and 3. In such a state the fulcrum ring 42 is substantially planar. The gaps 44 are all substantially the same length about axis X. The diaphragm spring 10 is formed with a plurality of substantially equi-spaced projections or ribs 46 extending substantially radially of the diaphragm spring and pressed out from the material of the spring, for example by coining. The ribs 46 extend from the Belleville part 14 someway into each finger 16. All the ribs are on the same side of the diaphragm spring 10 and have substantially the same depth d. In FIGS. 1 and 3 the ribs 46 contact substantially the central point of each ring portion 42A and have a substantially V-shaped cross-section.

When the released clutch is re-engaged by allowing the release bearing 32 to move in direction Z, the diaphragm spring 10 in urging the pressure plate 12 causes the ribs 46 to resiliently deform the ring portions 42A into the spaces 44 such as shown in FIG. 4. This deformation provides cushioning giving to the clutch re-engagement a subjectively acceptable feel.

The situation shown in FIG. 4 may be that prevailing when the clutch has become fully re-engaged.

On the other hand FIG. 4 may only represent a situation in which the clutch is partially re-engaged and and the diaphragm spring 10 is still able to move nearer to the pressure plate 12 and exert a still greater load thereon. In that case it will be observed that in the deforming of the fulcrum ring 42 into the state shown in FIG. 4, the ring portions 42B have become deformed by bowing towards the diaphragm spring 10. As the diaphragm spring continues to move further in direction Z (FIG. 1), the ribs 46 further deform the ring portions 42A and simultaneously the Belleville part 14 compresses the bows 42B in the same direction as the portions 42A are deformed (FIG. 5).

The ring 42 is less stiff when only the ring portions 42A are being pressed by the diaphragm spring 10. The ring is more stiff when both the ring portions 42A and the bows 42B are being pressed, and this provides a second stage of cushioning. The lands 36 are all of substantially the same length about the axis X.

The resilient fulcrum ring 42 may have any desired cross-section. To vary the cushion characteristic as desired, it is possible to vary:

(i) the thickness of the ring 42, and/or
(ii) the length of the spaces 44 and therefore the length of the ring portions 42A, and/or
(iii) the length of the lands 36 and therefore the length of the ring portions 42B, and/or
(iv) the rib depth d, and/or
(v) the number of ribs 46, spaces 44 and lands 36.

The technique described above for providing cushioning is relatively cheap and has the added advantage of the ribs 46 stiffening the diaphragm spring 10 and particularly the fingers 16 which increases the spring efficiency of the spring reducing the deflexion of the fingers.

In the modification in FIG. 6 ribs 46A are adhered, for example, by welding, to the diaphragm spring 10.

In the modification in FIGS. 7 and 8 the projections or ribs on the diaphragm spring 10 are formed by ridges or ribs 46B on brackets or plates 48 each formed with hooks or clips 50 engaging sides of notches 52 at the ends of the slots 18 to lock the ribs into position.

In the embodiment in FIG. 9 gaps 44A between adjacent lands 36A and 36B alternate with gaps 44B between the lands. Circumferencially or along the fulcrum ring 42 each space 44A is shorter than a said gap 44B. The space 44A can each be the same length. Also the spaces 44B can all be the same length. Portions 42C of the fulcrum ring spanning the spaces 44A are shorter than portions 42D spanning the spaces 44B, therefore the portions 42C are more resistant to resilient deformation than the portions 42D during clutch re-engagements, which property can be used to produce a desired cushioning characteristic. Optionally, and as shown in FIG. 9, the lands 36B can be circumferencially longer than the lands 36A.

The embodiment shown in FIGS. 10 and 11 has ribs 146 to press on the fulcrum ring 42 alternating with ribs 54 on the opposite side of the diaphragm spring 42. The ribs 146 and 54 are each opposite a respective said space 44. Thus during clutch re-engagements only alternate portions 42A of the fulcrum ring 42 are pushed by the ribs 146 into alternate spaces 44 so that initially over the other spaces 44 the fulcrum ring bows towards diaphragm springs 10 as indicated at 142B (FIG. 11). This embodiment can be used to produce a desire cushioning characteristic, it being, softer at least in a first stage of cushioning only to deform alternate ring portions 42A.

If desired the fulcrum ring can be further deformed until the diaphragm spring 10 contacts the bows 142B and flattens them towards the pressure plate, this deformation in addition to that occurring at the ribs 146 causes a second stage of harder cushioning to occur. In this embodiment it will be appreciated that for a given fulcrum ring the cushioning will be softer than in FIGS. 3 to 5. The ribs 54 serve to stiffen the diaphragm spring and preferably do not extend radially outwardly as far as the fulcrum ring 30 (FIG. 1).

FIGS. 12 to 14 show an embodiment in which the projections or ribs are formed by a first series of ribs 246A in which those ribs alternate with ribs 246B of a second series. From the diaphragm spring 10 each rib 246A has a depth dimension e greater than depth dimension of each rib 246B. During clutch re-engagement, the ribs 246A first deform their corresponding fulcrum ring portions 42A (FIG. 13) to provide a first stage of cushioning which is augmented and made more stiff when ribs 246B have moved sufficiently with the diaphragm spring 42 to deform their corresponding fulcrum ring portions 42A so that a second stage of cushioning is now a function of the resilient deformation of all the ring portions 42A.

Figure 15:
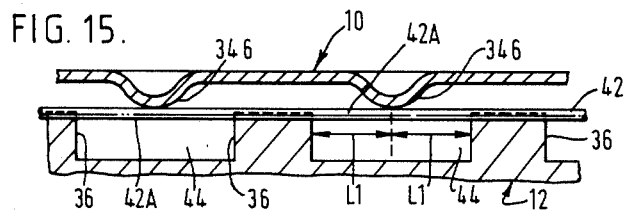
FIG. 15 is a cross-sectional view comparable with FIG. 3 (but taken through the supporting means) of a still further embodiment of a clutch cover assembly formed according to the invention.
Figure 16:
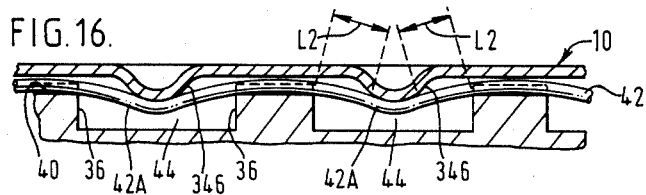
FIG. 16 shows the embodiment to FIG. 15 providing cushioning.

In the embodiment in FIGS. 15 and 16 the projection on the diaphragm spring 10 are ribs 346 each of relatively large arcuate cross-section and concave with respect to the fulcrum ring 42. With the clutch fully disengaged (FIG. 15) the fulcrum ring 42 is substantially tangential with respect to each rib 346. Thus each ring portion 42A between two adjacent lands 36 comprises two free lengths or beam portions each extending from a said land to the point of contact with the rib and having a length L1. During clutch re-engagement, as the diaphragm spring moves relatively nearer to the pressure plate 12 the ribs 346 increasingly deform each fulcrum ring portion 42A resiliently in the corresponding gap 44 in which the corresponding ring portion makes increasing line contact with the concave surface of the respective rib 346 such as illustrated in FIG. 16. Therefore as the said line contact increases, the free length of each beam portion progressively decreases. For example, in FIG. 16 a situation has been reached in which the free length of each beam portion of ring portion 42A has been reduced from L1 in FIG. 15 to L2. This progressive decrease in the free length of the beam portions makes them progressively more stiff and thus increase the resistance of the fulcrum ring to deformation by the ribs 346. Accordingly cushioning due to deformation of the ring portions 42A into the spaces 44 increases more in stiffness in the embodiment in FIGS. 15 and 16 than during the cushioning occurring as decribed with reference to FIGS. 3 and 4.

Figure 17:
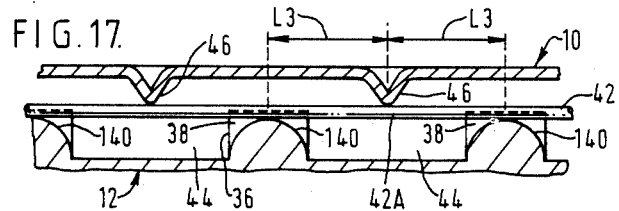
FIG. 17 is a cross-sectional view comparable with FIG. 3 (but taken through the supporting means) of yet another embodiment of a clutch cover assembly formed according to the invention.
Figure 18:
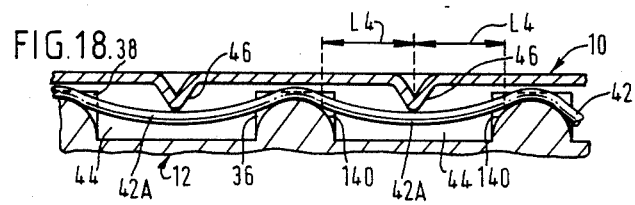
FIG. 18 shows the embodiment of FIG. 17 providing cushioning.

An effect comparable to that achieved in FIGS. 15 and 16 is attained in the embodiment in FIGS. 17 and 18 in which the grooves 38 in the lands 36 have bases 140 of arcuate cross-section making them concave with respect to the fulcrum ring 42. Initially in a clutch fully dis-engaged state (FIG. 17) the free length of each beam portion in ring portion 42A in L3. But as the fulcrum ring is deformed into the spaces 44 it makes increasing line contact with the bases 140 thus decreasing the free length of each beam portion in the situation in FIG. 18 is reduced to L4 which is less than L3.

If desired, the ribs 346 in FIG. 15 can be substituted for the ribs 46 in FIG. 17.

The invention can also be applied to a cover assembly of a push-type clutch in which the annular fulcrum arrangement on the cover has lesser diameter than, but is substantially concentric with, the annular fulcrum arrangement on the pressure plate.

In cover assemblies for either pull-type or push-type clutches the cushioning arrangement can be adapted or re-positioned so that a resilient fulcrum ring and supporting means serving a function comparable to the lands 36 are provided on the cover, the diaphragm spring being provided with appropriately facing projections. For example, with reference to FIGS. 1 to 5, the turned in part 30 can be formed with through apertures (not shown) so that the remaining spaced portions of the part 30 simulate the aforedescribed lands 36 in which case the ribs 46 are formed on the other side of the diaphragm spring to that shown so that fulcrum 28 constituted by a resilient ring provides the cushioning.

We claim:

1. A diaphragm spring friction clutch cover assembly comprising a pressure plate, a cover, a diaphragm spring having a plurality of radially inwardly directed fingers, said diaphragm spring acting between a first annular fulcrum arrangement on the pressure plate and a second annular fulcrum arrangement on the cover, at least one of said fulcrum arrangements comprising cushioning means comprising a resilient fulcrum ring, said one of said fulcrum arrangements further comprising an annular array of spaced supporting means supporting said fulcrum ring about an axis of said diaphragm spring, portions of said fulcrum ring each spanning a respective space which is disposed between adjacent said supporting means, said diaphragm spring being provided with ribs disposed at at least a Belleville part of the diaphragm spring, and said ribs face towards said fulcrum ring, whereby at least some of said portions are urged at spaced locations around said fulcrum ring by said ribs whereby axially of said fulcrum ring said urged portions of said fulcrum ring are resiliently deformed in said spaces during movement relative to said cover of said diaphragm spring for the latter to apply increasing loading on said pressure plate.

2. A clutch cover assembly according to claim 1, wherein said fulcrum ring and said supporting means are provided on said pressure plate.

3. A clutch cover assembly according to claim 1, wherein said fulcrum ring and said supporting means are provides on said cover.

4. A clutch cover assembly according to claim 1, wherein said ribs are substantially radial with respect to said axis of said diaphragm spring.

5. A clutch cover assembly according to claim 1, wherein each said rib extends from said Belleville part to a said finger.

6. A clutch cover assembly according to claim 1, wherein said ribs are formed integrally with said diaphragm spring by being pressed out of the material of said diaphragm spring.

7. A clutch cover assembly according to claim 1, wherein said ribs are added to said diaphragm spring and mounted thereon.

8. A clutch cover assembly according to claim 1, wherein said ribs are first ribs and said diaphragm spring has second ribs on an opposite side of said diaphragm spring to the side on which said first ribs are disposed, and said first and second ribs are formed integrally with diaphragm springs by being pressed out of the material of said diaphragm spring.

9. A clutch cover assembly according to claim 1, wherein said supporting means is formed with a groove in which said fulcrum ring is disposed.

10. A clutch cover assembly according to claim 1, wherein when said diaphragm spring is applying substantially no loading on said pressure plate said fulcrum ring is substantially planar.

11. A clutch cover assembly according to claim 1, wherein said urged portions of said fulcrum ring are first portions, and as said first portions are deformed axially in a first direction (as said diaphragm spring moves initially relative to said cover to apply increasing loading from a position where said diaphragm spring has been applying substantially no loading on said pressure plate) second portions of said fulcrum ring disposed over said supporting means bow axially in an opposite second axial direction towards said diaphragm spring and continued movement by said diaphragm spring compresses the bows.

12. A clutch cover assembly according to claim 1, wherein said ribs have, from said diaphragm spring, a depth dimension which is the same for each of the said ribs.

13. A clutch cover assembly as claimed in claim 1, in which at least one said rib has, from said diaphragm spring, a depth dimension which is greater than the depth dimension of another said rib.

14. A clutch cover assembly according to claim 1 wherein, along said fulcrum ring, the length of at least one of said spaces is greater than the length of another said space so that at least one of said spanning portions of said fulcrum ring is longer than another said spanning portion.

15. A clutch cover assembly according to claim 1, wherein a surface of a said rib pressing on a said portion of said fulcrum ring has a concave curved shape with respect to the said portion whereby as said portion is increasingly deformed by said rib the said portion progressively conforms more closely to said curved shape at said rib thereby progressively reducing the free length of a part of the said portion extending between said rib and an adjacent said supporting means.

16. A clutch cover assembly according to claim 1, wherein a surface of a said supporting means has a concave curved shape with respect to said fulcrum ring whereby as a said portion of said fulcrum ring adjacent to that supporting means is increasingly deformed by a said rib that said portion progressively conforms more closely to the said curved shape at the said supporting means thereby progressively reducing the free length of a part of the said portion extending between said rib and the said supporting means.

* * * * *